US012626950B2

(12) United States Patent (10) Patent No.: US 12,626,950 B2
Tanaka et al. (45) Date of Patent: May 12, 2026

(54) ALL-SOLID-STATE BATTERY

(71) Applicant: TDK CORPORATION, Tokyo (JP)

(72) Inventors: Teiichi Tanaka, Tokyo (JP); Takeo Tsukada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 690 days.

(21) Appl. No.: 17/765,566

(22) PCT Filed: Sep. 29, 2020

(86) PCT No.: PCT/JP2020/036904
§ 371 (c)(1),
(2) Date: Mar. 31, 2022

(87) PCT Pub. No.: WO2021/079700
PCT Pub. Date: Apr. 29, 2021

(65) Prior Publication Data
US 2022/0367846 A1 Nov. 17, 2022

(30) Foreign Application Priority Data

Oct. 23, 2019 (JP) ................................. 2019-192584

(51) Int. Cl.
*H01M 4/133* (2010.01)
*H01M 4/02* (2006.01)
*H01M 4/62* (2006.01)
*H01M 10/0562* (2010.01)
*H01M 10/0585* (2010.01)

(52) U.S. Cl.
CPC ....... *H01M 10/0562* (2013.01); *H01M 4/133* (2013.01); *H01M 4/625* (2013.01);
(Continued)

(58) Field of Classification Search
CPC ......... H01M 10/0562; H01M 2300/0068–008; H01M 4/133; H01M 4/583–587
See application file for complete search history.

(56) References Cited

U.S. PATENT DOCUMENTS

2012/0115028 A1 5/2012 Ueno et al.
2012/0264021 A1 10/2012 Sugiura et al.
(Continued)

FOREIGN PATENT DOCUMENTS

CN 110970668 B 10/2021
JP 2007-141573 A 6/2007
(Continued)

OTHER PUBLICATIONS

Nov. 28, 2023 English Translation of the Office Action issued in Chinese Patent Application No. 202080070736.X.
(Continued)

*Primary Examiner* — Robert S Carrico
(74) *Attorney, Agent, or Firm* — OLIFF PLC

(57) ABSTRACT

An all-solid-state battery includes a positive electrode layer, a negative electrode layer, and a solid electrolyte layer positioned between the positive electrode layer and the negative electrode layer, the positive electrode layer includes a positive electrode current collector and a positive electrode active material layer which is in contact with the positive electrode current collector, the negative electrode layer includes a negative electrode current collector and a negative electrode active material layer which is in contact with the negative electrode current collector, at least one of the positive electrode active material layer and the negative electrode active material layer has a plurality of voids and a plurality of carbon materials therein, and 8% or more of the plurality of voids are in contact with any of the plurality of carbon materials.

9 Claims, 5 Drawing Sheets

(52) U.S. Cl.
CPC .. *H01M 10/0585* (2013.01); *H01M 2004/027* (2013.01); *H01M 2004/028* (2013.01); *H01M 2300/0068* (2013.01); *H01M 2300/0071* (2013.01)

(56) References Cited

U.S. PATENT DOCUMENTS

| | | | | |
|---|---|---|---|---|
| 2021/0050621 A1* | 2/2021 | Woehrle | | H01M 10/0562 |
| 2021/0057781 A1* | 2/2021 | Tomizawa | | H01M 10/052 |
| 2021/0167417 A1* | 6/2021 | Chao | | H01M 10/0585 |
| 2021/0202929 A1 | 7/2021 | Yura | | |
| 2022/0093910 A1 | 3/2022 | Lan et al. | | |
| 2022/0094027 A1 | 3/2022 | Lee et al. | | |
| 2022/0140386 A1* | 5/2022 | Masuko | | H01M 10/0463 |
| | | | | 429/322 |

FOREIGN PATENT DOCUMENTS

| | | | |
|---|---|---|---|
| JP | 2012-104270 A | 5/2012 | |
| JP | 2012-186135 A | 9/2012 | |
| JP | 2012-243645 A | 12/2012 | |
| JP | 2014-192041 A | 10/2014 | |
| JP | 2016-207540 A | 12/2016 | |
| JP | 2017-054720 A | 3/2017 | |
| JP | 2018-206727 A | 12/2018 | |
| WO | 2012/144298 A1 | 10/2012 | |
| WO | 2013/175993 A1 | 11/2013 | |
| WO | WO-2019197121 A1 * | 10/2019 | ........ H01M 10/0525 |
| WO | WO-2020184476 A1 * | 9/2020 | ........ H01M 10/0463 |
| WO | 2021/079698 A1 | 4/2021 | |

OTHER PUBLICATIONS

Dec. 8, 2020 International Search Report issued in International Patent Application No. PCT/JP2020/036864.
Dec. 15, 2020 International Search Report issued in International Patent Application No. PCT/JP2020/036904.
Apr. 12, 2024 English translation of the Chinese Office Action issued in Chinese Patent Application No. 202080070736.X.
Nov. 4, 2024 Office Action issued in U.S. Appl. No. 17/765,367.
Jul. 24, 2025 Office Action issued in U.S. Appl. No. 17/765,367.

* cited by examiner

ALL-SOLID-STATE BATTERY

TECHNICAL FIELD

The present invention relates to an all-solid-state battery.

Priority is claimed on Japanese Patent Application No. 2019-192584, filed Oct. 23, 2019, the content of which is incorporated herein by reference.

BACKGROUND ART

In recent years, batteries have been used for various purposes. Batteries are also used, for example, in portable batteries, and are required to be smaller, lighter, thinner, and more reliable. Batteries using an electrolytic solution have problems such as liquid leakage and liquid depletion. Therefore, attention is focused on all-solid-state batteries using solid electrolytes.

An all-solid-state battery includes a positive electrode layer, a negative electrode layer, and a solid electrolyte layer. The positive electrode or the negative electrode expands and contracts when the all-solid-state battery is charged and discharged. The strain generated by the expansion and contraction of the positive electrode or the negative electrode is one of the causes of occurrence of cracks and one of the causes of peeling at the laminated interface of each layer.

For example, Patent Literature 1 discloses an all-solid-state battery having three solid electrolyte layers having different porosities between a positive electrode layer and a negative electrode layer. The three solid electrolyte layers having different porosities absorb the internal stress and suppress the occurrence of cracks.

CITATION LIST

Patent Literature

[Patent Literature 1]
PCT International Publication No. WO 20131175993

SUMMARY OF INVENTION

Technical Problem

Cracks and interfacial peeling are one of the causes of increase in internal resistance and one of the causes of deterioration of cycle characteristics.

Patent Literature 1 discloses a method for suppressing cracks. However, the structure of the all-solid-state battery is complicated and manufacturing is difficult. In addition, the thickness in the lamination direction increases, and the thickness of the entire all-solid-state battery increases.

The present invention has been made in view of the above-described problems, and an object thereof is to provide an all-solid-state battery capable of suppressing the occurrence of cracks and peeling at a laminated interface.

Solution to Problem

The inventors have found that, by arranging a plurality of voids and a plurality of carbon materials in contact with each other in the negative electrode layer or the positive electrode layer, which is the source origin of internal stress, the internal stress generated in the all-solid-state battery can be reduced and the occurrence of cracks or interfacial peeling can be absorbed. That is, in order to solve the above-described problems, the following means are provided.

(1) According to a first aspect, there is provided an all-solid-state battery including: a positive electrode layer, a negative electrode layer, and a solid electrolyte layer positioned between the positive electrode layer and the negative electrode layer, in which the positive electrode layer includes a positive electrode current collector and a positive electrode active material layer which is in contact with the positive electrode current collector, the negative electrode layer includes a negative electrode current collector and a negative electrode active material layer which is in contact with the negative electrode current collector, at least one of the positive electrode active material layer and the negative electrode active material layer has a plurality of voids and a plurality of carbon materials therein, and 8% or more of the plurality of voids are in contact with any of the plurality of carbon materials.

(2) In the all-solid-state battery according to the above-described aspect, at least a part of a side margin layer, which is disposed on an outer periphery thereof along each of the positive electrode layer and the negative electrode layer, may have a plurality of voids therein.

(3) In the all-solid-state battery according to the above-described aspect, at least a part of a side margin layer, which is disposed on an outer periphery thereof along each of the positive electrode layer and the negative electrode layer, may have a plurality of voids and a plurality of carbon materials therein, and 8% or more of the plurality of voids may be in contact with any of the plurality of carbon materials.

(4) In the all-solid-state battery according to the above-described aspect, each of the plurality of carbon materials may have shape anisotropy, and the major axis direction of each of the carbon materials may be oriented in an in-plane direction in which the positive electrode active material layer or the negative electrode active material layer spreads.

(5) In the all-solid-state battery according to the above-described aspect, an average major axis length of the plurality of carbon materials may be 0.2 µm or more and 40 µm or less, and the average minor axis length of the plurality of carbon materials may be 0.4 µm or more and 5 µm or less.

(6) In the all-solid-state battery according to the above-described aspect, a ratio of the plurality of carbon materials in the layer which includes the plurality of carbon materials and voids of the positive electrode active material layer and the negative electrode active material layer may be 2% or more and 40% or less.

(7) In the all-solid-state battery according to the above-described aspect, a ratio of the plurality of carbon materials in the layer which includes the plurality of carbon materials and voids of the positive electrode active material layer and the negative electrode active material layer may be 2% or more and 15% or less.

(8) In the all-solid-state battery according to the above-described aspect, a ratio a cross-section outer perimeter of the carbon materials which is in contact with any of the voids in the cross-section crossing the positive electrode and the negative electrode may be 10% or more and 70% or less.

(9) In the all-solid-state battery according to the above-described aspect, an intermediate layer having ionic conductivity may be provided between at least one of the positive and negative electrode layers and the solid electrolyte layer, the intermediate layer may have a plurality of voids, and a ratio of the plurality of voids in the intermediate layer may be 0.1% or more and 8% or less.

Advantageous Effects of Invention

The all-solid-state battery according to the above-described aspect can suppress the occurrence of cracks and peeling at the laminated interface.

BRIEF DESCRIPTION OF DRAWINGS

FIG. 1 is a schematic sectional view of an all-solid-state battery according to the present embodiment.

FIG. 3 is a plane view of an all-solid-state battery according to the present embodiment.

DESCRIPTION OF EMBODIMENTS

Figure 2:
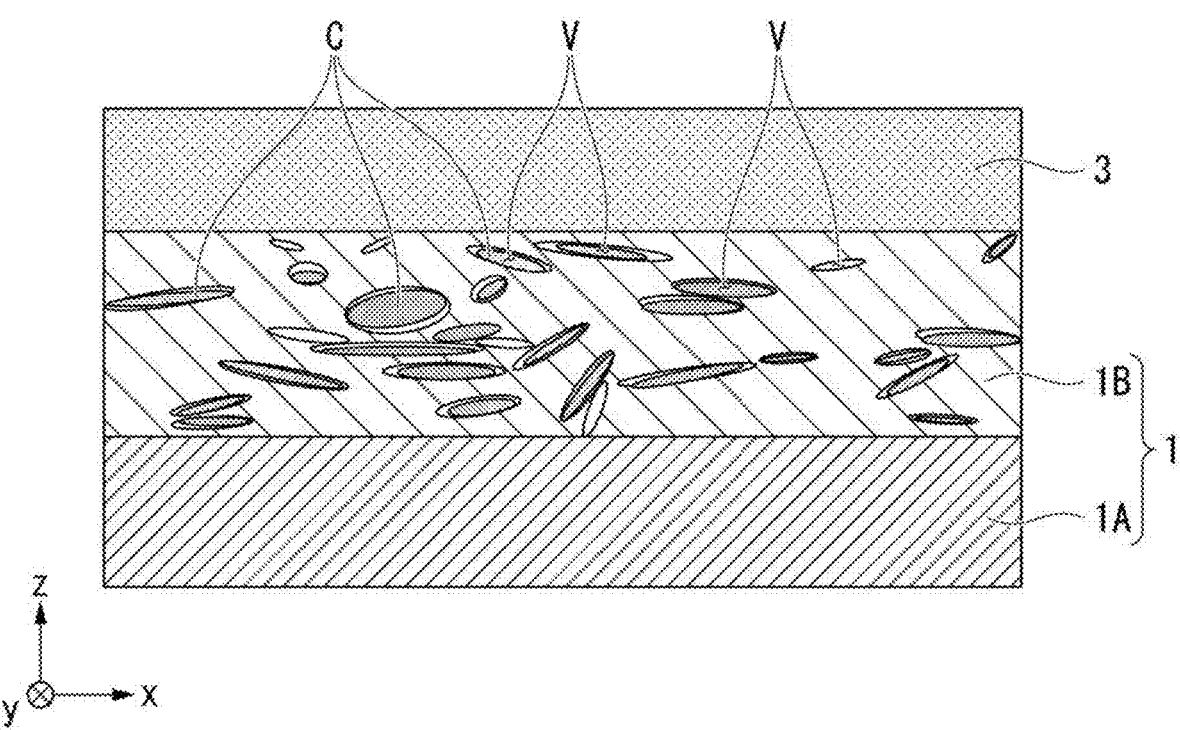
FIG. 2 is an enlarged view of a main part of the all-solid-state battery according to the present embodiment.

Hereinafter, the present invention will be described in detail with reference to the drawings as appropriate. In the drawings used in the following description, characteristic parts may be enlarged and illustrated in order to make it easy to understand the features of the present invention, and the dimensional ratios of each configuration element may differ from the actual ones. In addition, the materials and dimensions exemplified in the following description are examples, and the present invention is not necessarily limited thereto, but can be appropriately changed and carried out without changing the gist thereof.

First, the directions will be defined. The direction in which a positive electrode layer 1 and a negative electrode layer 2 (which will be described later) are laminated is defined as a z direction. Further, one of the in-plane directions in which the positive electrode layer 1 and the negative electrode layer 2 (which will be described later) spread is defined as an x direction, and the direction orthogonal to the x direction is defined as a y direction.

[All-Solid-State Battery]

Figure 1:
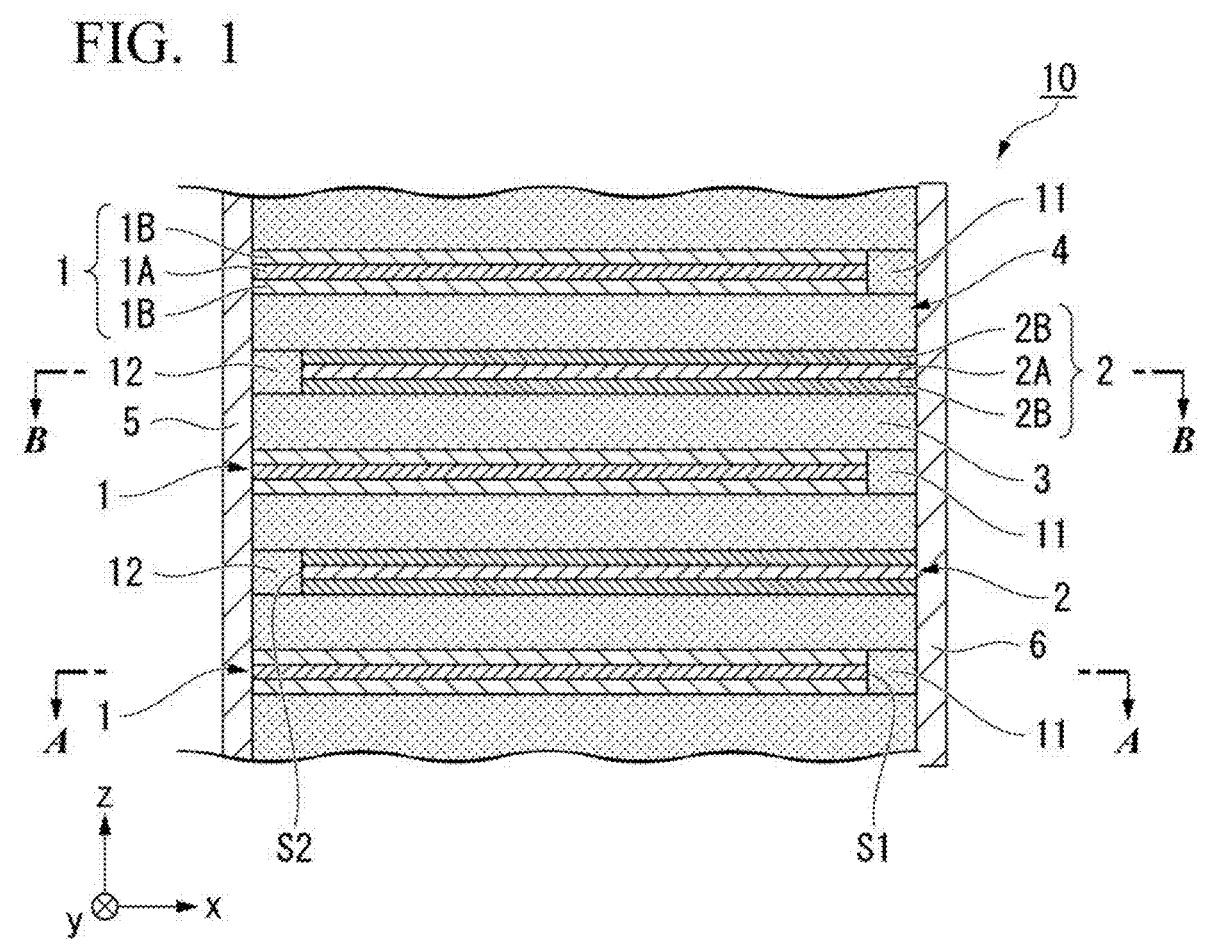

FIG. 1 is a schematic sectional view in which a main part of an all-solid-state battery according to a first embodiment is enlarged. As illustrated in FIG. 1, an all-solid-state battery 10 has a laminate 4. The laminate 4 has a plurality of positive electrode layers 1, a plurality of negative electrode layers 2, and a solid electrolyte layer 3 positioned between the positive electrode layers 1 and the negative electrode layers 2. The positive electrode layers 1 are an example of a first electrode layer, and the negative electrode layers 2 are an example of a second electrode layer. Any one of the first electrode layer and the second electrode layer functions as a positive electrode, and the other functions as a negative electrode. The positive electrode layers 1 and the negative electrode layers 2 are each connected to external terminals having corresponding polarity, and the positive electrode layers 1 and the negative electrode layers 2 are not in contact with each other.

The positive electrode layers 1 are each connected to a first external terminal 5, and the negative electrode layers 2 are each connected to a second external terminal 6. The first external terminal 5 and the second external terminal 6 are electrical contacts with the outside.

(Laminated Body)

The laminate 4 has the plurality of positive electrode layers 1, the plurality of negative electrode layers 2, and a plurality of solid electrolyte layers 3. Each of the solid electrolyte layers 3 is positioned between the positive electrode layers 1 and the negative electrode layers 2. The all-solid-state battery 10 is charged and discharged by exchanging lithium ions between the positive electrode layers 1 and the negative electrode layers 2 via the solid electrolyte layers 3.

[Positive Electrode Layers and Negative Electrode Layers]

For example, the plurality of positive electrode layers 1 and the plurality of negative electrode layers 2 are provided in the laminate 4. The positive electrode layers 1 and the negative electrode layers 2 are alternately laminated in the z direction with the solid electrolyte layers 3 interposed therebetween. Each of the positive electrode layers 1 and the negative electrode layers 2 spreads in the xy plane. Each of the first end portion of the positive electrode layers 1 is connected to the first external terminal 5, and a second end portion extends toward the second external terminal 6. Each of the second end portion of the positive electrode layers 1 is not connected to the second external terminal 6. Each of the first end portion of the negative electrode layers 2 is connected to the second external terminal 6, and the second end portion extends toward the first external terminal 5. Each of the second end portion of the negative electrode layers 2 is not connected to the first external terminal 5. A material similar to that of the solid electrolyte layers 3 is between the positive electrode layers 1 and the second external terminal 6 and between the negative electrode layers 2 and the first external terminal 5. Among the end surfaces of the positive electrode in the x direction, the end surface near the second external terminal 6 is referred to as positive electrode end surface S1. Among the end surface of the negative electrode in the x direction, the end surface near the first external terminal 5 is referred to as negative electrode end surface S2. The end surface S1, S2 are surfaces which are perpendicular to the x direction.

The positive electrode layers 1 have a positive electrode current collector layer 1A and a positive electrode active material layer 1B. The negative electrode layers 2 have a negative electrode current collector layer 2A and a negative electrode active material layer 2B.

The positive electrode current collector layer 1A and the negative electrode current collector layer 2A spread in the xy plane. The positive electrode current collector layer 1A and the negative electrode current collector layer 2A contain a material having excellent conductivity. The positive electrode current collector layer 1A and the negative electrode current collector layer 2A are parts containing a material having excellent conductivity at 50% or more when the all-solid-state battery 10 is divided along the xy plane. Materials having excellent conductivity are, for example, silver, palladium, gold, platinum, aluminum, copper, and nickel. Copper does not easily react with positive electrode active materials, negative electrode active materials, or solid electrolytes. For example, when copper is used for the positive electrode current collector layer 1A and the negative electrode current collector layer 2A, the internal resistance of the all-solid-state battery 10 can be reduced. The substances that form the positive electrode current collector layer 1A and the negative electrode current collector layer 2A may be the same or different.

The positive electrode current collector layer 1A may contain a positive electrode active material which will be described later. The negative electrode current collector layer 2A may contain a negative electrode active material which will be described later. The content ratio of the active material contained in each current collector layer is not particularly limited as long as the layer functions as a current collector. The volume ratio of the conductive material and the positive electrode active material in the positive electrode current collector layer 1A is, for example, in the range of 90:10 to 70:30. Similarly, the volume ratio of the conductive material and the negative electrode active material in the negative electrode current collector layer 2A is, for example, in the range of 90:10 to 70:30. When the positive electrode current collector layer 1A and the negative electrode current collector layer 2A contain the positive electrode active material and the negative electrode active material, respectively, the adhesion between the positive electrode current collector layer 1A and the positive electrode active material layer 1B and the adhesion between negative electrode current collector layer 2A and the negative electrode active material layer 2B are improved.

The positive electrode active material layer 1B and the negative electrode active material layer 2B spread in the xy plane. The positive electrode active material layer 1B is formed on one surface or both surfaces of the positive electrode current collector layer 1A. The positive electrode active material layer 1B may not be present on the surface of the positive electrode current collector layer 1A on the side where the opposing negative electrode layer 2 is not located. Further, the negative electrode active material layer 2B is formed on one surface or both surfaces of the negative electrode current collector layer 2A. The negative electrode active material layer 2B may not be present on the surface of the negative electrode current collector layer 2A on the side where the opposing positive electrode layer 1 is not located. For example, the positive electrode layer 1 or the negative electrode layer 2 positioned at the uppermost layer or the lowermost layer of the laminate 4 may not have the positive electrode active material layer 1B or the negative electrode active material layer 2B on one surface.

The positive electrode active material layer 1B and the negative electrode active material layer 2B contain active materials that exchange electrons during charging and discharging. The positive electrode active material layer 1B contains a positive electrode active material. The negative electrode active material layer 2B contains a negative electrode active material. The positive electrode active material layer 1B and the negative electrode active material layer 2B may each contain a conductive auxiliary agent, a binding agent, or the like. It is preferable for the positive electrode active material and the negative electrode active material to be able to efficiently insert and desorb lithium ions.

The positive electrode active material and the negative electrode active material are, for example, a transition metal oxide and a transition metal composite oxide. Specifically, the positive electrode active material and the negative electrode active material are, for example, a lithium manganese composite oxide $Li_2Mn_aMa_{1-a}O3$ ($0.8 \leq a \leq 1$, Ma=Co, Ni), lithium cobalt oxide ($LiCoO_2$), lithium nickel oxide ($LiNiO_2$), lithium manganese spinel ($LiMn_2O_4$), a composite metal oxide represented by a general formula $LiNi_xCo_yMn_zO_2$ ($x+y+z=1$, $0 \leq x \leq 1$, $0 \leq y \leq 1$, $0 \leq z \leq 1$), a lithium vanadium compound ($LiV_2O_5$), olivine-type $LiMbPO_4$ (where Mb is one or more elements selected from Co, Ni, Mn, Fe, Mg, Nb, Ti, Al, and Zr), lithium vanadium phosphate ($Li_3V_2(PO_4)_3$ or $LiVOPO_4$), a Li excess solid solution positive electrode represented by $Li_2MnO_3\text{-}LiMcO_2$ (Mc=Mn, Co, Ni), lithium titanate ($Li_4Ti_5O_{12}$), a composite metal oxide represented by $Li_sNi_tCo_uAl_vO_2$ ($0.9 < s < 1.3$, $0.9 < t+u+v < 1.1$) or the like.

There is no clear distinction between the active materials that form the positive electrode active material layer 1B and the negative electrode active material layer 2B, and by comparing the potentials of the two types of compounds, the compound showing a more noble potential can be used as the positive electrode active material and a compound showing a lower potential can be used as the negative electrode active material.

At least one of the positive electrode active material layer 1B and the negative electrode active material layer 2B has a plurality of voids and a plurality of carbon materials therein. FIG. 2 is an enlarged schematic view of the vicinity of the interface between the positive electrode layer 1 and the solid electrolyte layer 3 of the all-solid-state battery 10 according to the present embodiment. The positive electrode active material layer 1B illustrated in FIG. 2 has a plurality of voids V and a plurality of carbon materials C. Although the positive electrode active material layer 1B is illustrated in FIG. 2, the negative electrode active material layer 2B may have a plurality of voids V and a plurality of carbon material C, and the positive electrode active material layer 1B and the negative electrode active material layer 2B may have a plurality of voids V and a plurality of carbon material C.

The plurality of carbon materials C are arranged between active materials that form positive electrode active material layer 1B and negative electrode active material layer 2B. The carbon materials C help electrons to be conducted in the positive electrode active material layer 1B or the negative active material layer 2B. The carbon materials C are referred to as conductive auxiliary agent in some case. The carbon materials C are, for example, scale-like carbon, carbon nanotube, carbon black, or graphene.

The ratio of the plurality of carbon materials C in the positive electrode active material layer 1B or the negative electrode active material layer 2B (hereinafter, referred to as the area ratio of a plurality of carbon materials C) is preferably, for example, 2% or more and 40% or less, and more preferably 3% or more and 30% or less. The area ratio of carbon materials C is, for example, the average value of the plurality of cross-sectional images obtained by a scanning electron microscope (SEM).

First, five xz cross-sections and five yz cross-sections of the positive electrode active material layer 1B are imaged. Each of the areas of the positive electrode active material layer 1B is obtained in each image. In the actual SEM image, the interface between the positive electrode current collector layer 1A and the positive electrode active material layer 1B and the interface between the positive electrode active material layer 1B and the solid electrolyte layer 3 are not flat. Therefore, the area of the positive electrode active material layer 1B is converted as the area of the region interposed between the xy plane that spreads to the average height position of the interface between the positive electrode current collector layer 1A and the positive electrode active material layer 1B, and the xy plane that spreads to the average height position of the interface between the positive electrode active material layer 1B and the solid electrolyte layer 3.

Next, the areas of the plurality of carbon materials C in each image are obtained. The areas of the plurality of carbon materials C can be obtained, for example, by the following procedure. First, the carbon materials C are extracted from each of the taken images. The carbon material C can be distinguished from the other parts because the hue of the carbon material is different from the other parts in each image. Then, the area ratio of the carbon materials C in the positive electrode active material layer 1B is obtained, and the area ratio of the plurality of carbon materials C is obtained by calculating the average value.

Each of the carbon materials C has, for example, shape anisotropy. In FIG. 2, the carbon material C is schematically illustrated as an ellipse. However, the shape of the carbon material C does not matter. Each of the carbon materials C is, for example, amorphous. When the carbon materials C is amorphous, the assumed ellipse having the smallest area including a carbon material is assumed to be the shape of the carbon material, and the length in the major axis direction and the length in the minor axis direction of the assumed ellipse are considered as the length in the major axis direction and the length in the minor axis direction of the carbon material. Here, the shape of the carbon material and the ellipse to be assumed are determined as follows. Among ellipses with the smallest area including the ellipse, when a length LLe in the major axis direction of the ellipse is superimposed on a length LLc in the direction in which the length of the carbon material C is the longest (LLe=LLC), the ellipse with the shortest length SLe in the minor axis direction is assumed to be the shape of this carbon material.

The aspect ratio of the carbon material C is, for example, 2 or more and 29 or less, and preferably 5 or more and 16 or less, and more preferably 8 or more and 13 or less. The aspect ratio is the value obtained by dividing the length in the major axis direction by the length in the minor axis direction.

The average major axis length of the carbon materials C is, for example, 0.2 μm or more and 100 μm or less, and preferably larger than 0.5 μm and 40 μm or less. The average minor axis length of the carbon materials C is, for example, 0.1 μm or more and 50 μm or less, preferably 0.2 μm or more and 20 μm or less, and more preferably 0.4 μm or more and 5 μm or less. The average major axis length and the average minor axis length of the carbon materials C when there are a plurality of carbon materials C are obtained by extracting two large carbon materials C from each of the above-described 10 binarized images as the average value of a total of 20 carbon materials.

Further, each of the carbon materials C is preferably oriented in the xy plane. "Oriented in the xy plane" means that the major axis direction of the carbon material C is tilted by 45 degrees or more from the z direction. Further, it is preferable that the major axis direction of the carbon material C substantially coincide with the in-plane direction in which the xy plane spreads. The fact that the major axis direction of the carbon material C substantially coincides with the in-plane direction means that the tilt angle of the carbon material C with respect to the xy plane in the major axis direction is 10 degrees or less. Here, there is no need for all the carbon materials to be oriented in xy plane, and there is no need for the major axis direction of all the carbon materials C to substantially coincide with the in-plane direction. For example, 50% or more of the carbon materials C are preferably oriented in the xy plane, and long axis direction of 50% or more of the carbon materials preferably substantially coincide with the in-plane direction.

A plurality of voids V are arranged in the positive active material layer 1B or negative active material layer 2B. Since the active material is responsible for the conduction of electrons during charging and discharging, it is common to densely fill the positive electrode active material layer 1B and the negative electrode active material layer 2B with the active material. The plurality of voids V are intentionally provided.

The ratio of the plurality of voids V in the positive electrode active material layer 1B or the negative electrode active material layer 2B (hereinafter, referred to as an porosity) is, for example, 2% or more and 15% or less, and preferably 5% or more and 12% or less, and more preferably 8% or more and 12% or less. The porosity is, for example, calculated by dividing the difference between theoretical mass and measured mass by measured mass. The majored mass is calculated by multiplying the average density of positive active material layer 1B or negative active material layer 2B and the volume thereof. The majored mass is the mass which is actually measured.

At least one void V is in contact with the carbon material C. Each of the voids V is positioned near of the carbon material C. The ratio of the voids V which are in contact with the carbon material C is 8% or more, and preferably 10% or more, and more preferably 30% or more. The ratio of the voids V which are in contact with the carbon material C is 80% or less, and preferably 70% or less, and more preferably 50% or less. Further, for example, the ratio of the circuit of the cross-section outer circumference of a plurality of carbon materials C which is in contact with any of the voids V are preferably 10% or more and 70% or less.

In order to arrange the voids V to be in contact with the carbon materials C, it is preferable to support the filler on the carbon material C before a process of pasting when producing the positive electrode active material layer 1B or the negative electrode active material layer 2B. Specifically, by dry type mechanical particle compounding which use an impact type compression shear type particle compounding device, the filler can be supported on the carbon material C. Therefore, the porosity which is in contact with the carbon materials C can be regulated by adjusting the amount of filler which is supported by the carbon material C.

"Solid Electrolyte Layer"

The solid electrolyte layer 3 is positioned between the positive electrode layer 1 and the negative electrode layer 2, respectively. As will be described later, side margin layers 11 and 12 made of the same material as that of the solid electrolyte layer 3 may be provided between the positive electrode layer 1 and the second external terminal 6 and between the negative electrode layer 2 and the first external terminal 5.

The solid electrolyte layer 3 contains a solid electrolyte. The solid electrolyte is a substance (for example, particles) capable of moving ions by an electric field applied from the outside. For example, lithium ions move in a solid electrolyte by the electric field applied from the outside. The solid electrolyte is an insulator that inhibits the movement of electron The solid electrolyte contains, for example, lithium. The solid electrolyte may be, for example, either an oxide-based material or a sulfide-based material. The solid electrolyte may be, for example, any of a perovskite type compound, a LISICON type compound, a garnet type compound, a NASICON type compound, a thio-LISICON type compound, a glass compound, and a phosphate compound. $La_{0.5}Li_{0.5}TiO_3$ is an example of a perovskite type compound. $Li_{14}Zn(GeO_4)_4$ is an example of a LISICON type compound. $L_{17}La_3Zr_2O_{12}$ is an example of a garnet type compound. $LiZr_2(PO_4)_3$, $Li_{1.3}Al_{0.3}Ti_{1.7}(PO_4)_3$, $Li_{1.5}Al_{0.5}Ge_{1.5}(PO_4)_3$, $Li_{1.55}Al_{0.2}Zr_{1.7}Si_{0.25}P_{9.75}O_{12}$, $Li_{1.4}Na_{0.1}Zr_{1.5}Al_{0.5}(PO_4)_3$, $Li_{1.4}Ca_{0.25}Er_{0.3}Zr_{1.7}(PO_4)_{3.2}$, and $Li_{1.4}Ca_{0.25}Yb_{0.3}Zr_{1.7}(PO_4)_{3.2}$ are examples of a NASICON type compound. $Li_{3.25}Ge_{0.25}P_{0.75}S_4$ and $Li_3PS_4$ are examples of a thio-LISICON type compound. $Li_2S—P_2S_5$ and $Li_2O—V_2O_5—SiO_2$ are examples of a glass compound. $Li_3PO_4$, $Li_{3.5}Si_{0.5}P_{0.5}O_4$, and $Li_{2.9}PO_{3.3}N_{0.46}$ are examples of a phosphate compound. The solid electrolyte may contain one or more of these compounds.

The shape of the solid electrolyte is not particularly limited. The shape of the solid electrolyte is, for example, spherical, ellipsoidal, needle-like, plate-like, scale-like, tubular, wire-like, rod-like, or amorphous. The particle size of the solid electrolyte is, for example, 0.1 μm or more and 10 μm or less, and may be 0.3 μm or more and 9 μm or less. The particle size of the particles is obtained from the measured value (D50) obtained by measuring the particle size distribution. D50 is the diameter of the particles in which the integrated value in the distribution curve obtained by measuring the particle size distribution is 50%. The particle size distribution of the particles is measured by, for example, a particle size distribution measuring device using a laser diffraction/scattering method (microtrack method).

[Side Margin Layer]

Figure 3:
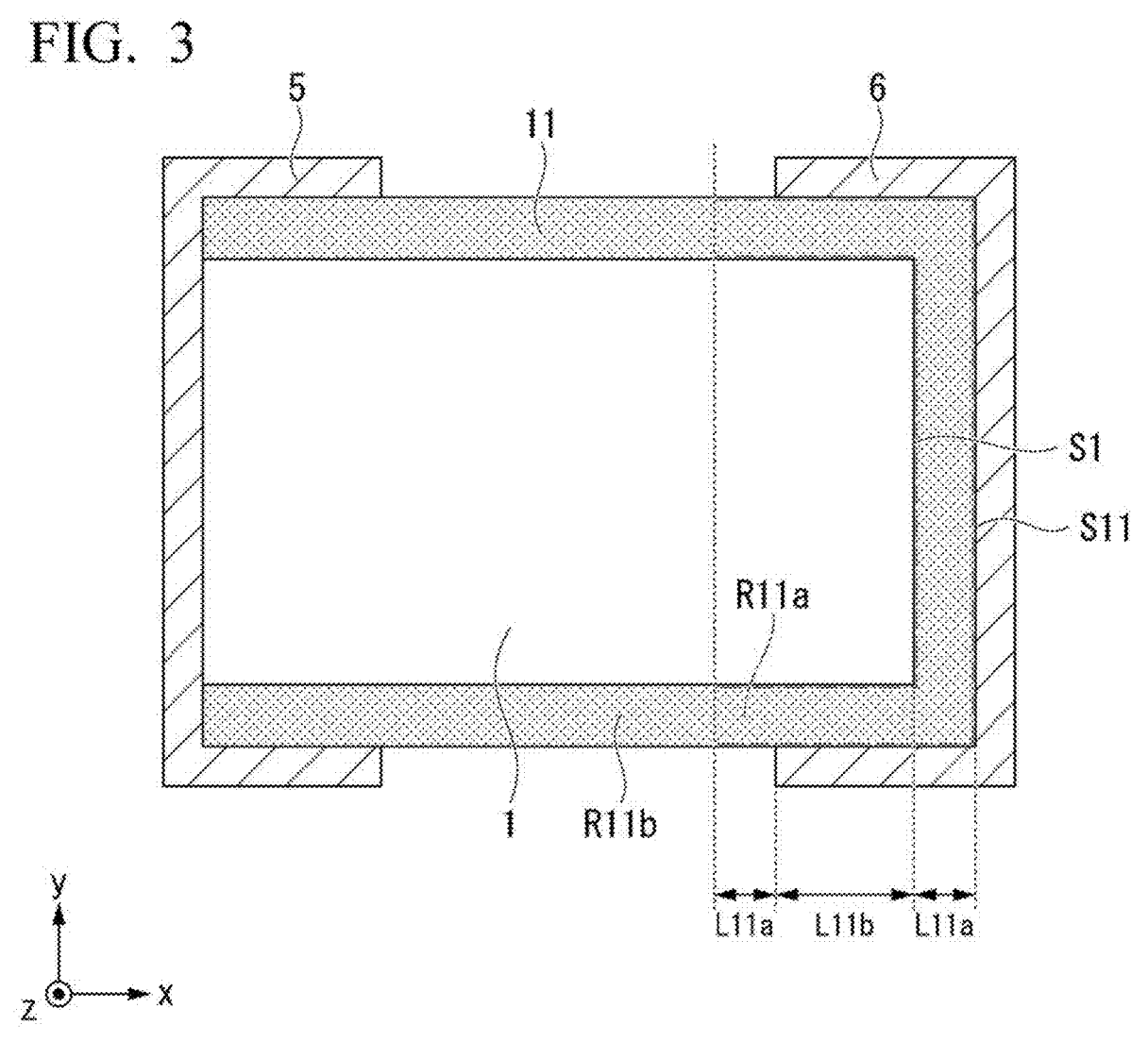
Figure 4:
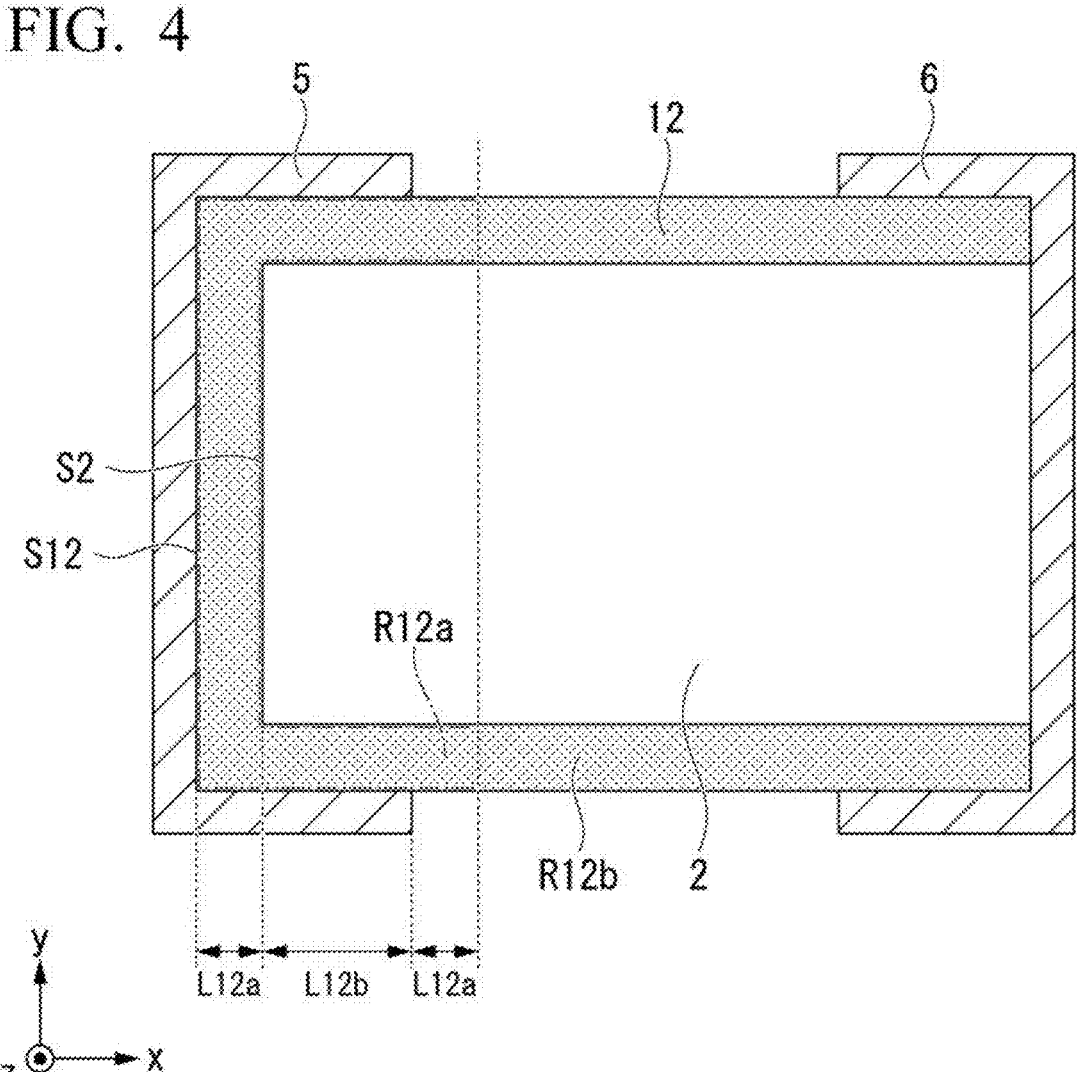
FIG. 4 is a plane view of an all-solid-state battery according to the present embodiment.
Figure 5:
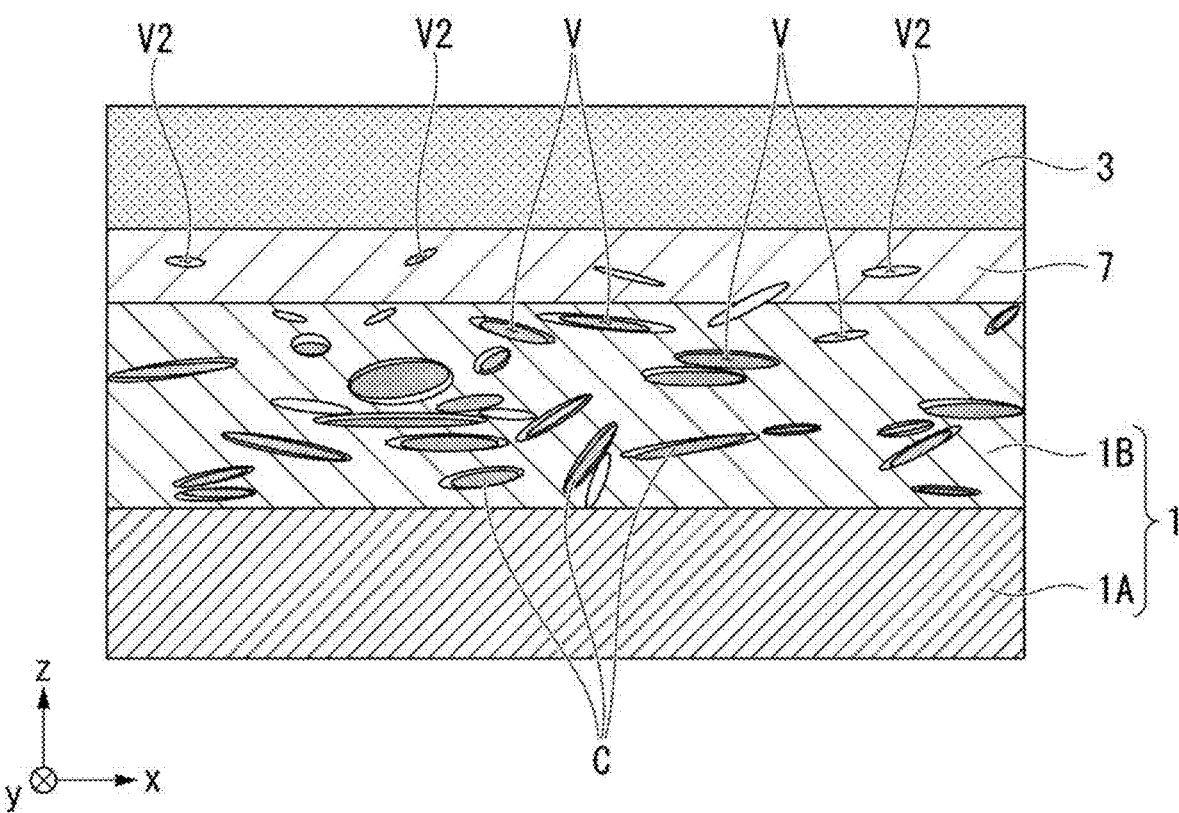
FIG. 5 is an enlarged view of a main part of an all-solid-state battery according to a first modification example.

As illustrated in FIG. 1, the laminate 4 is disposed on the outer periphery thereof along each of the positive electrode layer 1 and the negative electrode layer 2, and includes side margin layers 11 and 12 containing a solid electrolyte. The side margin layers 11 and 12 may be referred to as a positive electrode side margin layer and a negative electrode side margin layer, respectively. FIG. 3 is a cross-sectional view which is taken along with the A-A section line in FIG. 1. FIG. 4 is a cross-sectional view which is taken along with the B-B section line in FIG. 1. In FIG. 3 and FIG. 4, for the convenience of description, the first external terminal 5 and the second external terminal 6 are illustrated together.

The side margin layer 11 includes a first region R11a and a second region R11b. Among the side margin layer 11, the first region R11a is a region near the second external terminal 6, and the second region R11b is a region near the first external terminal 5. When the end surface near the second external terminal 6 is referred to as the first end surface S11 among the end surfaces of the side margin layer 11 in the x direction, and when the minimum distance between the first end surface S11 and the positive electrode layer 1 is referred to as L11a, and when the length of the side surface of the second external terminal 6 is referred to as L11b, the first region R11a is a region from the first end surface S11 to the length L11a×2+L11b. The second region R11b is a region far from the first end surface S11 by L11a×2+L11b or more.

Likewise, the side margin layer 12 includes a first region R12a and a second region R12b. Among the side margin layer 12, the first region R12a is a region near the first external terminal 5, and the second region R12b is a region near the second external terminal 6. When the end surface near the first external terminal 5 is referred to as the first end surface S12 among the end surfaces of the side margin layer 12 in the x direction, and when the minimum distance between the first end surface S12 and the negative electrode layer 2 is referred to as L12a, the first region R12a is a region from the first end surface S12 to the length L12a×2+L12b. The second region R12b is a region far from the first end surface S12 by L12a×2+L12b or more.

The solid electrolyte contained in the side margin layers 11 and 12 may be the same as or different from the solid electrolyte contained in the solid electrolyte layer 3.

The side margin layers 11 and 12 are preferably provided in order to eliminate the step between the solid electrolyte layer 3 and the positive electrode layer 1 and the step between the solid electrolyte layer 3 and the negative electrode layer 2. Therefore, the side margin layers 11 and 12 are formed at substantially the same height as that of the positive electrode layer 1 or the negative electrode layer 2 (that is, so as to be disposed along each of the positive electrode layer 1 and the negative electrode layer 2) in regions other than the positive electrode layer 1 and the negative electrode layer 2 on the main surface of the solid electrolyte layer 3. Due to the presence of the side margin layers 11 and 12, the steps between the solid electrolyte layer 3 and the positive electrode layer 1 and the solid electrolyte layer 3 and the negative electrode layer 2 are eliminated, and thus the interfaces between the solid electrolyte layer 3 and each electrode layer become dense, and delamination and warpage due to firing of the all-solid-state battery are less likely to occur.

At least a part of the side margin layers 11 and 12 can have a plurality of voids and carbon materials therein. When the side margin layers 11 and 12 do not have a plurality of voids and carbon materials therein, the side margin layers 11 and 12 can have the same configuration as that of the solid electrolyte layer 3. It is preferable that each of the side margin layers 11 and 12 have a plurality of voids and carbon materials therein. The configuration of the plurality of voids and carbon materials contained inside the side margin layers 11 and 12 can be the same as the configuration of the plurality of voids V and carbon materials C contained in at least one of the positive electrode active material layer 1B and the negative electrode active material layer 2B.

At least one of the void among the plurality of voids contained in a part of the side margin layer 11 and 12 is in contact with the carbon material. Each void is near the carbon material. The ratio of voids which is in contact with the carbon material is 8% or more, and preferably 10% or more, and more preferably 30% or more. Here, when the side margin layers 11 and 12 have a plurality of voids and carbon materials therein, the carbon material in the side margin layer 11 and 12 avoids the vicinity of the second external terminal 6 and first external terminal 5 respectively. For example, the ratio of the carbon material in the first region R11a and R12a are preferably lower than the ratio of the carbon material in the second region R11b and R12b respectively. Further, for example, the ratio of the carbon material in the first region R11a and R12a is preferably 7% or less since self-discharge can be prevented, and more preferably 5% or less. Further, the ratio of the voids V which is in contact with the carbon material C is preferably 80% or less, and more preferably 70% or less, and still more preferably 50% or less.

The ratio of the plurality of carbon materials in the second region R11b of the side margin layer 11 and in the second region R12b of the side margin layer 12 (hereinafter, referred to as the area ratio of the plurality of carbon materials in the side margin layer) is, for example, preferably 2% or more and 40% or less, and more preferably 3% or more and 30% or less. The area ratio of the plurality of carbon materials in the side margin layer is obtained by the same method as that of the area ratio of the plurality of carbon materials in the positive electrode active material layer 1B or the negative electrode active material layer 2B by using the average value of the plurality of cross-sectional images obtained by a scanning electron microscope (SEM).

The porosity of the side margin layer 11 and 12 is preferably 3% or more. The porosity of the side margin layer 11 and 12 is obtained by the same method as that of the positive active material layer 1B and the negative active material layer 2B.

(Terminal)

For the first external terminal 5 and the second external terminal 6, for example, a material having excellent conductivity is used. The first external terminal 5 and the second external terminal 6 are, for example, any of silver, gold, platinum, aluminum, copper, tin, or nickel. The first external terminal 5 and the second external terminal 6 may be a single layer or a plurality of layers.

(Protective Layer)

The all-solid-state battery 10 may have a protective layer on the outer periphery that electrically, physically, and chemically protects the laminate 4 or the terminal. As the protective layer, for example, an environmentally safe material having excellent insulation, durability, and moisture resistance is preferable. The protective layer is, for example, glass, ceramics, a thermosetting resin, or a photocurable resin. Only one type of protective layer material may be used, or a plurality of protective layer materials may be used in combination. The protective layer may be a single layer or a plurality of layers. The protective layer is preferably an organic-inorganic hybrid in which a thermosetting resin and ceramic powder are mixed.

Next, a method for manufacturing an all-solid-state battery according to the present embodiment will be described.

The all-solid-state battery 10 may be prepared by a simultaneous firing method or a sequential firing method. The simultaneous firing method is a method of laminating the materials that form each layer and then firing the materials all at once. The sequential firing method is a method of firing each layer each time the layers are laminated. The simultaneous firing method has a simpler work process than that of the sequential firing method. Further, the laminate 4 prepared by the simultaneous firing method is denser than the laminate 4 prepared by the sequential firing method. Hereinafter, a case where the simultaneous firing method is used will be described as an example.

First, a paste for each layer that forms the laminate 4 is prepared. The materials that form the positive electrode current collector layer 1A, the positive electrode active material layer 1B, the solid electrolyte layer 3, the side margin layers 11 and 12, the negative electrode active material layer 2B, and the negative electrode current collector layer 2A are each made into a paste. The pasting method is not particularly limited. For example, the powder of each material is mixed with a vehicle to obtain a paste. Vehicle is a general term for media in the liquid phase. The vehicle contains a solvent and a binder.

A filler and carbon material C are added to at least one of the vehicles of the positive electrode active material layer 1B and the negative electrode active material layer 2B. When void and carbon material are to be included inside the side margin layers 11 and 12, the filler and carbon material are also added to the vehicles of the side margin layers 11 and 12. The filler is added adhering to the carbon material. The filler is, for example, a debinder, a resin material, or a carbon material. All fillers volatilize during firing. The carbon material used as a filler volatilizes during firing and is distinguishable from the carbon materials C. The filler is, for example, a pore forming material. The pore forming material is, for example, resin particles such as polyethylene, polypropylene, and polyethylene terephthalate. The filler adhering to the carbon material C volatilizes during firing to form the void V.

Next, a green sheet is prepared. The green sheet is a paste processed into a sheet. The green sheet is obtained, for example, by coating a base material such as polyethylene terephthalate (PET) with the paste in a desired order, drying the paste as necessary, and then peeling the paste from the base material. The paste coating method is not particularly limited. For example, known methods such as screen printing, coating, transfer, and doctor blade can be adopted.

When preparing the green sheet of the positive electrode active material layer 1B and the negative electrode active material layer 2B, the carbon material C can be oriented in the in-plane direction by controlling the coating speed or performing coating through a mesh having an opening Each of the prepared green sheets is stacked in a desired order with the desired number of laminated layers. Alignment, cutting, and the like are performed as necessary to prepare a laminate. When a parallel type or series/parallel type battery is prepared, the positive electrode current collector layer and the negative electrode current collector layer are aligned such that the end surface of the positive electrode current collector layer the end surface of the negative electrode current collector layer do not coincide with each other.

The laminate may be prepared after preparing the positive electrode active material layer unit and the negative electrode active material layer unit described below.

First, a paste for a solid electrolyte layer is formed on a PET film in the form of a sheet by the doctor blade method, and dried. Next, the paste for the positive electrode active material layer is printed on the green sheet of the solid electrolyte layer by screen printing, and dried.

Next, the paste for the positive electrode current collector layer is printed on the dried paste for the positive electrode active material layer by screen printing, and dried. Furthermore, the paste for the positive electrode active material layer is printed again on the dried paste for the positive electrode current collector layer by screen printing, and dried. Then, the paste for the side margin layer is screen-printed in the region of the solid electrolyte layer sheet other than the positive electrode layer and dried to form a side margin layer having a height substantially equal to that of the positive electrode layer. Then, a positive electrode unit is prepared by peeling off the PET film. In the positive electrode unit, the positive electrode layer 1, in which the positive electrode active material layer 1B, the positive electrode current collector layer 1A, and the positive electrode active material layer 1B are laminated in this order, and the side margin layer 11 are formed on the main surface of the solid electrolyte layer 3.

A negative electrode unit is also prepared by the same procedure. In the negative electrode unit, the negative electrode layer 2, in which the negative electrode active material layer 2B, the negative electrode current collector layer 2A, and the negative electrode active material layer 2B are laminated in this order and the side margin layer 12, are formed on the main surface of the solid electrolyte layer 3.

Next, the positive electrode unit and the negative electrode unit are laminated. The positive electrode unit and the negative electrode unit are laminated such that the solid electrolyte layers of each of the units do not face each other. In the laminate formed by lamination, the positive electrode active material layer 1B, the positive electrode current collector layer 1A, the positive electrode active material layer 1B, the solid electrolyte layer 3, the negative electrode active material layer 2B, the negative electrode current collector layer 2A, the negative electrode active material layer 2B, and the solid electrolyte layers 3 are laminated in this order. The positive electrode unit and the negative electrode unit are stacked in a staggered manner such that the positive electrode current collector layer 1A is exposed to a first end surface of the laminate, and the negative electrode current collector layer 2A is exposed to a second end surface opposite to the first end surface. A sheet for the solid electrolyte layer having a predetermined thickness is further stacked, for example, on the uppermost layer and the lowermost layer in the lamination direction, and dried.

Next, the prepared laminates are collectively crimped. Crimping is performed while heating. The heating temperature is, for example, 40 to 95° C. Next, the crimped laminate is sintered. Sintering is performed, for example, by heating in a temperature range of 500° C. or higher and 1100° C. or lower in a nitrogen atmosphere. The firing time is, for example, 0.1 to 3 hours. The laminate 4 is obtained by sintering. At this time, the filler becomes the void V.

The sintered body may be placed in a cylindrical container together with a polishing material such as alumina, and barrel-polished. The corners of the sintered body are chamfered by polishing. Polishing may be performed by sandblasting or the like.

Finally, the first external terminal 5 and the second external terminal 6 are attached to the laminate 4. The first external terminal 5 is formed so as to be in electrical contact with each of the positive electrode current collector layers 1A. The second external terminal 6 is formed so as to be in electrical contact with each of the negative electrode current collector layer 2A. For example, the first external terminal 5 is connected to the positive electrode current collector layer 1A exposed from the side surface of the laminate 4, and the second external terminal 6 is connected to the negative electrode current collector layer 2A exposed from the side surface of the laminate 4. The first external terminal 5 and the second external terminal 6 can be prepared by, for example, a sputtering method, a dipping method, a spray coating method, or the like.

In the all-solid-state battery according to the present embodiment, at least one of the positive electrode active material layer 1B and the negative electrode active material layer 2B has a plurality of carbon materials C and a plurality of voids V and at least one of the plurality of voids V is in contact with the carbon material C such that the occurrence of cracks and peeling at the laminated interface can be suppressed. When the occurrence of cracks and peeling at the laminated interface can be suppressed, the cycle characteristic of the all-solid-state battery is improved.

The positive electrode active material layer 1B and the negative electrode active material layer 2B are formed densely so as to improve electronic conductivity. Therefore, in general, the positive electrode active material layer 1B and the negative electrode active material layer 2B are formed not to have void V therein. On the other hand, as the result of considering in the examples to be described, providing the void V to be in contact with the carbon material C is found to improve cycle characteristic.

The reason that providing the void V to be in contact with the carbon material C improves cycle characteristic is not obvious. The stress associated with the expanding and contracting during charging and discharging can be further absorbed comparing with the case where the void V exists alone. The easiness of distortion of the void V, the carbon material C, and the active material when stress is applied is in this order. That is, when the void V is provided along with the carbon material C, stress is propagated from the active material to the carbon material C and to the void V in this order and the stress may be absorbed by stages.

Further, when the carbon material C has shape anisotropy, the carbon material C is easily crushed in the minor axis direction, and can properly buffer the volume change of the active material. The positive electrode active material layer 1B and the negative electrode active material layer 2B expand and contract mainly in the z direction. When the carbon material C is oriented in the xy plane, the minor axis direction of the carbon material C becomes the z direction. The carbon material C is easily crushed in the minor axis direction, the minor axis direction of the carbon material C is the z direction, and accordingly, cracks and interfacial peeling can be suppressed more effectively.

Although the embodiments of the present invention have been described above in detail with reference to the drawings, the respective configurations and combinations thereof in the respective embodiments are merely examples, and additions, omissions, substitutions, and other changes of configurations are possible within the scope not departing from the gist of the present invention.

First Modification Example

FIG. 3 is an enlarged sectional view of a main part of an all-solid-state battery according to a first modification example. FIG. 3 is an enlarged view of the vicinity of the interface between the positive electrode layer 1 and the solid electrolyte layer 3 of the all-solid-state battery. The all-solid-state battery illustrated in FIG. 3 differs from the all-solid-state battery illustrated in FIG. 2 in that the intermediate layer 7 is provided between the positive electrode layer 1 and the solid electrolyte layer 3. Although FIG. 3 illustrates an example in which the intermediate layer 7 is provided between the positive electrode layer 1 and the solid electrolyte layer 3, the intermediate layer 7 may be provided between the negative electrode layer 2 and the solid electrolyte layer 3.

The intermediate layer 7 spreads in the xy plane and is positioned between the positive electrode active material layer 1B or the negative electrode active material layer 2B and the solid electrolyte layer 3. The intermediate layer 7 is a layer having a composition between the active material that forms the positive electrode active material layer 1B or the negative electrode active material layer 2B and the solid electrolyte that forms the solid electrolyte layer 3. For example, when the positive electrode active material layer 1B or the negative electrode active material layer 2B is lithium vanadium phosphate ($Li_3V_2(PO_4)_3$, $Li_2VTi(PO_4)_3$, $LiVOPO_4$) and the solid electrolyte is lithium zirconium phosphate ($LiZr_2(PO_4)_3$), the intermediate layer 7 is lithium zirconium phosphate containing vanadium or lithium vanadium phosphate containing zirconium. Lithium zirconium phosphate containing vanadium is obtained by replacing a part of zirconium of lithium zirconium phosphate with vanadium. Lithium vanadium phosphate containing zirconium is obtained by replacing a part of vanadium of vanadium lithium phosphate with zirconium. The intermediate layer 7 enhances the bonding strength between the positive electrode active material layer 1B or the negative electrode active material layer 2B and the solid electrolyte layer 3.

The intermediate layer 7 may have, for example, a plurality of voids V2. The ratio of the plurality of voids V2 in the intermediate layer 7 is preferably 0.1% or more and 8% or less. When the intermediate layer 7 also has the plurality of voids V2, the internal stress associated with the expansion and contraction of the active material can be absorbed, and the occurrence of cracks and interfacial peeling can be suppressed more effectively. Further, since the ratio of the plurality of voids V2 in the intermediate layer 7 is not extremely high, the bonding strength between the positive electrode active material layer 1B or the negative electrode active material layer 2B and the solid electrolyte layer 3 can be maintained, and the occurrence of interfacial peeling can be suppressed more effectively.

The intermediate layer 7 is obtained by separately preparing a layer in which constituent elements were adjusted in advance and inserting the prepared layer between the solid electrolyte layer 3 and the positive electrode active material layer 1B or the negative electrode active material layer 2B. Further, the firing conditions may be adjusted to thermally diffuse the constituent elements (for example, zirconium) of the solid electrolyte layer 3 into the positive electrode active material layer 1B or the negative electrode active material layer 2B, or to thermally diffuse the constituent elements (for example, vanadium) of the positive electrode active material layer 1B or the negative electrode active material layer 2B into the solid electrolyte layer 3.

The all-solid-state battery according to the first modification example has the same effect as that of the all-solid-state battery according to the first embodiment. Further, the intermediate layer 7 can enhance the bonding strength between the positive electrode active material layer 1B or the negative electrode active material layer 2B and the solid electrolyte layer 3, and can more effectively suppress the occurrence of interfacial peeling.

EXAMPLES

Example 1

The all-solid-state battery of Example 1 was prepared as follows.
(Preparation of Active Material)

As the active material, lithium vanadium phosphate prepared by the following method was used. Using $Li_2CO_3$, $V_2O_5$, and $NH_4H_2PO_4$ as starting materials, wet mixing was performed in a ball mill for 16 hours, and the powder obtained after dehydration drying was calcined at 850° C. for 2 hours in a nitrogen-hydrogen mixed gas. The calcined product was wet-pulverized in a ball mill and then dehydrated and dried to obtain an active material. It was confirmed by using an X-ray diffractometer that the prepared powder had the same crystal structure as that of $Li_3V_2(PO_4)_3$.
(Preparation of Paste for Active Material Layer)

Regarding the paste for the active material layer, the paste for the positive electrode active material layer and the paste for the negative electrode active material layer were prepared by adding 15 parts of ethyl cellulose as a binder and 65 parts of dihydroterpineol as a solvent to 95.4 parts of active material powder, 0.6 parts of filler, and 4 parts of flat carbon material powder, which were obtained together and by performing mixing and dispersing. As the filler, polypropylene was used. As the carbon material, scale-like graphite was used. The length in the major axis direction of the carbon material was 0.5 μm, the length in the minor axis direction of that was 0.1 μm, and the aspect ratio of that was 5.0. The filler was supported on the carbon material using an impact type compression shear type particle compounding device.
(Preparation of Solid Electrolyte)

As the solid electrolyte, an LZP-based NASICON type compound (for example, $LiZr_{1.7}Ca_{0.3}(PO_4)_3$) prepared by the following method was used. Using $Li_2CO_3$, $ZrO_2$, $CaCO_3$, and $NH_4H_2PO_4$ as starting materials, wet mixing was performed in a ball mill for 16 hours, dehydrated, and dried, and then the obtained powder was calcined in the air at 900° C. for 2 hours. After calcination, wet pulverization was performed in a ball mill for 16 hours, and then dehydration and drying were performed to obtain a solid electrolyte powder. It was confirmed by using an X-ray diffractometer (XRD) that the prepared powder had the same crystal structure as that of the LZP-based NASICON type compound.

(Preparation of Paste for Solid Electrolyte Layer)

The paste for the solid electrolyte layer was prepared by adding 100 parts of ethanol and 200 parts of toluene as a solvent to 100 parts of the solid electrolyte powder and performing wet-mixing in a ball mill, and then by adding 16 parts of a polyvinyl butyral binder and 4.8 parts of benzyl butyl phthalate and performing mixing.
(Preparation of Sheet for Solid Electrolyte Layer)

The paste for the solid electrolyte layer is formed into a sheet by the doctor blade method using the PET film as a base material, and a sheet for the solid electrolyte layer having a thickness of 15 μm was obtained.
(Preparation of Paste for Current Collector Layer)

As a positive electrode current collector and a negative electrode current collector, a paste for the current collector layer was prepared by mixing Cu and lithium vanadium titanium phosphate, which is an active material, such that the volume ratio is 80/20, and then by mixing and dispersing after adding 100 parts of the obtained mixture, 10 parts of ethyl cellulose as a binder, and 50 parts of dihydroterpineol as a solvent.
(Preparation of Base Material for Intermediate Layer)

In preparing the base material for the intermediate layer, lithium vanadium phosphate powder prepared as an active material and the LZP-based NASICON type compound powder prepared with a solid electrolyte are wet-mixed for 16 hours in a ball mill, and the powder obtained after dehydration and drying was calcined at 850° C. for 2 hours in a nitrogen-hydrogen mixed gas. The calcined product was wet-pulverized in a ball mill and then dehydrated and dried to obtain the base powder for the intermediate layer.
(Preparation of Paste for Intermediate Layer)

Regarding the paste for the intermediate layer, the paste for the intermediate layer was prepared by adding 0.5 part of a filler (polyethylene), 15 parts of ethyl cellulose as a binder, and 65 parts of dihydroterpineol as a solvent to 100 parts of the base powder for the intermediate layer, and by performing mixing and dispersing.
(Preparation of External Terminal Paste)

A thermosetting external electrode paste was prepared by mixing and dispersing silver powder, an epoxy resin, and a solvent.

Using these pastes, the all-solid-state battery of Example 1 was prepared as follows.
(Preparation of Positive Electrode Layer Unit)

First, an intermediate layer (referred to as a first positive electrode intermediate layer) having a thickness of 0.2 μm was formed on the sheet for the solid electrolyte layer by screen printing, and dried at 80° C. for 10 minutes. Next, a positive electrode active material layer (referred to as a first positive electrode active material layer) having a thickness of 5 μm was formed on the intermediate layer by screen printing, and dried at 80° C. for 10 minutes. Furthermore, a positive electrode current collector layer having a thickness of 5 μm was formed on the positive electrode current collector layer by screen printing, and dried at 80° C. for 10 minutes. Furthermore, a positive electrode active material layer (referred to as a second positive electrode active material layer) having a thickness of 5 μm was formed again on the positive electrode active material layer by screen printing, and dried at 80° C. for 10 minutes. Furthermore, an intermediate layer (referred to as a second positive electrode intermediate layer) having a thickness of 0.2 μm is formed again on the positive electrode active material layer by screen printing, and dried at 80° C. for 10 minutes to prepare a positive electrode layer on the sheet for the solid electrolyte layer. Next, a side margin layer having a height substantially flush with that of the positive electrode layer was formed on the outer periphery of one end of the positive electrode layer by screen printing, and dried at 80° C. for 10 minutes. Then, the PET film was peeled off to obtain a sheet of the positive electrode layer unit.

(Preparation of Negative Electrode Layer Unit)

Next, an intermediate layer (referred to as a first negative electrode intermediate layer) having a thickness of 0.2 μm was formed on the sheet for the solid electrolyte layer by screen printing, and dried at 80° C. for 10 minutes. Next, a negative electrode active material layer (referred to as a first negative electrode active material layer) having a thickness of 5 μm was formed on the intermediate layer, and dried at 80° C. for 10 minutes. Furthermore, a negative electrode current collector layer having a thickness of 5 μm was formed on the negative electrode active material layer by screen printing, and dried at 80° C. for 10 minutes. Furthermore, a negative electrode active material layer (referred to as a second negative electrode active material layer) having a thickness of 5 μm was formed again on the negative electrode current collector layer by screen printing, and dried at 80° C. for 10 minutes. Furthermore, an intermediate layer (referred to as a second negative electrode intermediate layer) having a thickness of 0.2 μm is formed again on the negative electrode active material layer by screen printing, and dried at 80° C. for 10 minutes to prepare a negative electrode layer on the sheet for the solid electrolyte layer. Next, a margin layer having a height substantially flush with that of the negative electrode layer was formed on the outer periphery of one end of the negative electrode layer by screen printing, and dried at 80° C. for 10 minutes. Then, the PET film was peeled off to obtain a sheet of the negative electrode layer unit.

(Preparation of Laminate)

A plurality of positive electrode layer units and negative electrode layer units were alternately laminated while being offset such that one end of each unit did not coincide with each other, to prepare a laminated substrate. Further, a plurality of solid electrolyte sheets were laminated as outer layers on both main surfaces of the laminated substrate, and an outer layer of 200 μm was provided. This was thermo-compression-bonded by a die press and then cut to prepare a laminate of an unfired all-solid-state battery. Then, the laminate was debound and fired to obtain a laminate of an all-solid-state battery. The laminate is fired by raising the temperature to 1000° C. of the firing temperature in nitrogen at a temperature rise rate of 200° C./hour, maintaining the temperature for 2 hours, and taking out the laminate after natural cooling. The filler became a void, and some voids are in contact with the carbon material.

(External Electrode Forming Process)

The end surface of the laminate of the all-solid-state battery was coated with an external terminal paste, and heat curing was performed at 150° C. for 30 minutes to form a pair of external electrodes.

The dimensions of the prepared all-solid-state battery were approximately 4.5 mm×3.2 mm×1.1 mm.

The initial capacity and cycle characteristics of the prepared all-solid-state battery were obtained. The initial capacity and cycle characteristics were determined using a secondary battery charging/discharging test device. The voltage range was from 0.2 V to 2.6 V. First, as a pretreatment, only the first charging was performed with 0.2 C of constant current charging. After this, charging and discharging were performed to obtain the cycle characteristics. Charging was performed with a constant current and a constant voltage. Charging was performed when the current value is 0.2 C, and after reaching 2.6 V, the charging was completed when the current value reached 5% of the current value of 0.2 C. The discharging was performed under the condition of discharging at a current value of 0.1 C. The cycle characteristics were evaluated as the capacity retention rate (%). The capacity retention rate (%) is the ratio of the discharge capacity after 100 cycles to the initial discharge capacity, with the discharge capacity of the first cycle as the initial discharge capacity. The capacity retention rate (%) is expressed by the following formula.

Capacity retention rate (%)=("Discharge capacity after 100 cycles"/"Discharge capacity in first cycle")×100

In addition, the all-solid-state battery produced be the same condition is cut, and the area ratio of the carbon materials in the positive electrode active material layer and the negative electrode active material layer, and porosity and the like were obtained.

Examples 2 to 6

The difference from Example 1 is that the major axis length and the minor axis length of the carbon material are changed under the condition that the aspect ratio is substantially constant. The major axis length, the minor axis length, and the aspect ratio of the carbon materials were adjusted by the shape of the carbon material added to the green sheet of the positive electrode active material layer and the negative electrode active material layer. In Examples 2 to 6, the same measurement as that in Example 1 was performed.

Examples 7 to 12

The difference from Example 1 is that the major axis length and the minor axis length of the carbon material are changed. The major axis length, the minor axis length, and the aspect ratio of the carbon materials were adjusted by the shape of the carbon material added to the paste of the positive electrode active material layer and the negative electrode active material layer. In Examples 7 to 12, the same measurement as that in Example 1 was performed.

Examples 13 to 18

The difference from Example 1 is that the minor axis length of the carbon material is constant and the major axis length and the aspect ratio of the carbon material are changed. The major axis length and the aspect ratio of the carbon material were adjusted by the shape of the carbon material added to the paste of the positive electrode active material layer and the negative electrode active material layer. In Examples 13 to 18, the same measurement as that in Example 1 was performed.

Examples 19 to 24

The difference from Example 1 is that the carbon material having a major axis length of 5.1 μm, and having a minor axis length of 0.9 μm was used so as to change the ratio of carbon material and porosity of the positive electrode active material layer and the negative electrode active material layer. The ratio of the carbon material in the positive electrode active material layer and the negative electrode active material layer was adjusted by the amount of the carbon material added to the paste of the positive active material layer and the negative active material layer. The porosity was adjusted by the amount of filer added to the paste of positive active material layer and the negative electrode active material layer. In Examples 19 to 24, the same measurement as that in Example 1 was performed.

Examples 25 to 30

The difference from Example 1 is that, among the plurality of voids, the ratio of the void which is in contact with the carbon material was changed. The ratio of the carbon material which is in contact with the carbon material was adjusted by adjusting the amount of the filler supported on the carbon material at the time of using an impact type compression shear type particle compounding device and therefore the amount of the filler supported on the carbon material was changed. In Examples 25 to 30, the same measurement as that in Example 1 was performed.

Example 31

When preparing the paste for the positive electrode active material layer and the negative electrode active material layer using a carbon material having a major axis length of 10.0 μm and a minor axis length of 0.9 μm, no mesh was used. Other conditions were the same as those in Example 1. The carbon materials of Example 31 were not particularly oriented in a predetermined direction, and the direction of the major axis was random. In Example 31, the same measurement as that in Example 1 was performed.

Examples 32 to 36

Using a carbon material having a major axis length of 10.0 μm and a minor axis length of 0.9 μm, the porosity of the positive electrode active material layer and the negative electrode active material layer was changed. The porosity was adjusted by the amount of the filled added. Other conditions were the same as those in Example 1. In Examples 32 to 36, the same measurement as that in Example 1 was performed.

Example 37

The difference from Example 21 is that the amount of the filler added to the intermediate layer is changed and the porosity of the intermediate layer is changed. Other conditions were the same as those in Example 21.

Comparative Example 1

The difference from Example 1 is that the carbon material having a major axis length of 10.0 μm, and having a minor axis length of 0.9 μm was used, and the ratio of the void which is in contact with the carbon material is 2%. Other conditions were the same as those in Example 1.

Example 12-2

In Example 12-2, side margin layer was printed using the paste for side margin layer (with void), and a plurality of voids and prepared an all-solid-state battery having a plurality of voids and a plurality of carbon materials therein. Other conditions were the same as those in Example 12.

(Preparation of Paste for Side Margin Layer (with Void))

The paste for the side margin layer was prepared by adding 15 parts of ethyl cellulose as a binder and 65 parts of dihydroterpineol as a solvent to 98.6 parts of the solid electrolyte powder, 0.4 parts of filler, and 1 parts of flat carbon material powder, which were obtained together and by performing mixing and dispersing. As the filler, polypropylene was used. As the carbon material, scale-like graphite was used. The length in the major axis direction of the carbon material was 0.2 μm, the length in the minor axis direction of that was 0.1 μm, and the aspect ratio of that was 2.0. The filler was supported on the carbon material using an impact type compression shear type particle compounding device.

Examples 12-3 to 12-6

In Examples 12-3 to 12-6, the amount of the filler was changed so as to the porosity of the side margin layer was changed. Other conditions were the same as those in Example 12-2. In Example 12, the porosity of the side margin layer is less than 2%. In Table 3, the porosity of the side margin layer is added in Example 12 of Table 1, and Example 12-1 is described. The same measurements as those in Example 1 were performed in Example 12-2 to 12-6, and further, the porosity of the side margin layer was measured.

Examples 101 to 136

As Examples 101 to 136, all-solid-state batteries were prepared without the process of forming the intermediate layer. In other words, the all-solid-state batteries of Examples 101 to 136 do not have an intermediate layer. Regarding other conditions, Examples 101 to 136 were the same as those of Examples 1 to 36, respectively.

Comparative Example 2

As Comparative Example 2, all-solid-state battery was prepared without the process of forming the intermediate layer. In other words, the all-solid-state battery of Comparative Example 2 does not have an intermediate layer. Regarding other conditions, Comparative Example 2 was the same as those of Comparative Example 1.

The above results were shown in Tables 1 to 5. It is noted that, the initial capacity in Tables 1 to 5 shows the ratio when the initial capacity of Example 1 is set to 100%. Tables 4 and 5 show the results of Examples 101 to 136 and Comparative Example 2. The all-solid-state batteries of Examples 101 to 136 and Comparative Example 2 do not have an intermediate layer. Therefore, in the all-solid-state batteries of Examples 101 to 136 and Comparative Example 2, the area ratio of the voids in the intermediate layer was not measured.

TABLE 1

| | Major axis length of carbon material (μm) | Minor axis length of carbon material (μm) | Aspect ratio | Orientation direction | Ratio of carbon materials in active material layer | Ratio of voids which is in contact with carbon materials | Porosity | Porosity of intermediate layer | Initial capacity | Cycle characteristics |
|---|---|---|---|---|---|---|---|---|---|---|
| Example 1 | 0.5 | 0.1 | 5.0 | Within xy plane | 12.0% | 30% | 4% | 4% | 100% | 58% |
| Example 2 | 1.0 | 0.2 | 5.0 | Within xy plane | 12.0% | 30% | 4% | 4% | 100% | 67% |
| Example 3 | 2.1 | 0.4 | 5.3 | Within xy plane | 12.0% | 30% | 4% | 4% | 99% | 75% |
| Example 4 | 5.0 | 1.0 | 5.0 | Within xy plane | 12.0% | 30% | 4% | 4% | 101% | 86% |

TABLE 1-continued

| | Major axis length of carbon material (μm) | Minor axis length of carbon material (μm) | Aspect ratio | Orientation direction | Ratio of carbon materials in active material layer | Ratio of voids which is in contact with carbon materials | Porosity | Porosity of intermediate layer | Initial capacity | Cycle characteristics |
|---|---|---|---|---|---|---|---|---|---|---|
| Example 5 | 11.0 | 2.2 | 5.0 | Within xy plane | 12.0% | 30% | 4% | 4% | 100% | 87% |
| Example 6 | 25.1 | 5.6 | 4.5 | Within xy plane | 12.0% | 30% | 4% | 4% | 100% | 76% |
| Example 7 | 8.1 | 1.0 | 8.1 | Within xy plane | 12.0% | 30% | 4% | 4% | 101% | 91% |
| Example 8 | 15.5 | 1.9 | 8.2 | Within xy plane | 12.0% | 30% | 4% | 4% | 101% | 82% |
| Example 9 | 24.0 | 3.2 | 7.5 | Within xy plane | 12.0% | 30% | 4% | 4% | 98% | 74% |
| Example 10 | 38.9 | 4.7 | 8.3 | Within xy plane | 12.0% | 30% | 4% | 4% | 102% | 63% |
| Example 11 | 45.0 | 5.5 | 8.2 | Within xy plane | 12.0% | 30% | 4% | 4% | 101% | 58% |
| Example 12 | 0.2 | 0.1 | 2.0 | Within xy plane | 12.0% | 30% | 4% | 4% | 101% | 60% |
| Example 13 | 1.8 | 0.9 | 2.0 | Within xy plane | 12.0% | 30% | 4% | 4% | 101% | 68% |
| Example 14 | 4.8 | 0.9 | 5.3 | Within xy plane | 12.0% | 30% | 4% | 4% | 100% | 80% |
| Example 15 | 8.1 | 0.9 | 9.0 | Within xy plane | 12.0% | 30% | 4% | 4% | 101% | 86% |
| Example 16 | 14.0 | 0.9 | 15.6 | Within xy plane | 12.0% | 30% | 4% | 4% | 101% | 80% |
| Example 17 | 22.1 | 0.9 | 24.6 | Within xy plane | 12.0% | 30% | 4% | 4% | 99% | 72% |
| Example 18 | 26.0 | 0.9 | 28.9 | Within xy plane | 12.0% | 30% | 4% | 4% | 101% | 60% |

TABLE 2

| | Major axis length of carbon material (μm) | Minor axis length of carbon material (μm) | Aspect ratio | Orientation direction | Ratio of carbon materials in active material layer | Ratio of voids which is in contact with carbon materials | Porosity | Porosity of intermediate layer | Initial capacity | Cycle characteristics |
|---|---|---|---|---|---|---|---|---|---|---|
| Example 19 | 5.1 | 0.9 | 5.6 | Within xy plane | 2.7% | 30% | 2% | 4% | 122% | 72% |
| Example 20 | 5.1 | 0.9 | 5.6 | Within xy plane | 4.3% | 30% | 3% | 4% | 112% | 77% |
| Example 21 | 5.1 | 0.9 | 5.6 | Random | 12.0% | 30% | 6% | 4% | 98% | 82% |
| Example 22 | 5.1 | 0.9 | 5.6 | Random | 20% | 30% | 9% | 4% | 84% | 90% |
| Example 23 | 5.1 | 0.9 | 5.6 | Within xy plane | 27% | 30% | 12% | 4% | 68% | 85% |
| Example 24 | 5.1 | 0.9 | 5.6 | Within xy plane | 35% | 30% | 15% | 4% | 55% | 91% |
| Example 25 | 5.1 | 0.9 | 5.6 | Within xy plane | 12.0% | 8% | 4% | 4% | 101% | 66% |
| Example 26 | 5.1 | 0.9 | 5.6 | Within xy plane | 12.0% | 11% | 4% | 4% | 100% | 71% |
| Example 27 | 5.1 | 0.9 | 5.6 | Within xy plane | 12.0% | 30% | 4% | 4% | 101% | 85% |
| Example 28 | 5.1 | 0.9 | 5.6 | Within xy plane | 12.0% | 50% | 4% | 4% | 101% | 88% |
| Example 29 | 5.1 | 0.9 | 5.6 | Within xy plane | 12.0% | 70% | 4% | 4% | 101% | 84% |
| Example 30 | 5.1 | 0.9 | 5.6 | Within xy plane | 12.0% | 80% | 4% | 4% | 102% | 80% |
| Example 31 | 10.0 | 0.9 | 11.1 | Random | 12.0% | 30% | 4% | 4% | 100% | 66% |
| Example 32 | 10.0 | 0.9 | 11.1 | Within xy plane | 12.0% | 18% | 2% | 4% | 110% | 60% |
| Example 33 | 10.0 | 0.9 | 11.1 | Within xy plane | 12.0% | 25% | 3% | 4% | 106% | 76% |
| Example 34 | 10.0 | 0.9 | 11.1 | Within xy plane | 12.0% | 30% | 4% | 4% | 101% | 85% |

TABLE 2-continued

| | Major axis length of carbon material (μm) | Minor axis length of carbon material (μm) | Aspect ratio | Orientation direction | Ratio of carbon materials in active material layer | Ratio of voids which is in contact with carbon materials | Porosity | Porosity of intermediate layer | Initial capacity | Cycle characteristics |
|---|---|---|---|---|---|---|---|---|---|---|
| Example 35 | 10.0 | 0.9 | 11.1 | Within xy plane | 12.0% | 30% | 8% | 4% | 97% | 88% |
| Example 36 | 10.0 | 0.9 | 11.1 | Within xy plane | 12.0% | 30% | 12% | 4% | 76% | 87% |
| Example 37 | 10.0 | 0.9 | 11.1 | Within xy plane | 12.0% | 30% | 4% | 10% | 101% | 67% |
| Comparative Example 1 | 10.0 | 0.9 | 11.1 | Within xy plane | 12.0% | 2% | 4% | 4% | 102% | 43% |

TABLE 3

| | Major axis length of carbon material (μm) | Minor axis length of carbon material (μm) | Aspect ratio | Orientation direction | Ratio of carbon materials in active material layer | Ratio of voids which is in contact with carbon materials | Porosity | Porosity of intermediate layer | Porosity of side margin layer | Initial capacity | Cycle characteristics |
|---|---|---|---|---|---|---|---|---|---|---|---|
| Example 12-1 | 0.2 | 0.1 | 2.0 | Within xy plane | 12.0% | 30% | 4% | 4% | Less than 2% | 101% | 60% |
| Example 12-2 | 0.2 | 0.1 | 2.0 | Within xy plane | 12.0% | 30% | 4% | 4% | 3% | 101% | 61% |
| Example 12-3 | 0.2 | 0.1 | 2.0 | Within xy plane | 12.0% | 30% | 4% | 4% | 5% | 101% | 63% |
| Example 12-4 | 0.2 | 0.1 | 2.0 | Within xy plane | 12.0% | 30% | 4% | 4% | 8% | 101% | 65% |
| Example 12-5 | 0.2 | 0.1 | 2.0 | Within xy plane | 12.0% | 30% | 4% | 4% | 15% | 101% | 66% |
| Example 12-6 | 0.2 | 0.1 | 2.0 | Within xy plane | 12.0% | 30% | 4% | 4% | 20% | 101% | 66% |

TABLE 4

| | Major axis length of carbon material (μm) | Minor axis length of carbon material (μm) | Aspect ratio | Orientation direction | Ratio of carbon materials in active material layer | Ratio of voids which is in contact with carbon materials | Porosity | Porosity of intermediate layer | Initial capacity | Cycle characteristics |
|---|---|---|---|---|---|---|---|---|---|---|
| Example 101 | 0.5 | 0.1 | 5.0 | Within xy plane | 12.0% | 30% | 4% | — | 101% | 51% |
| Example 102 | 1.0 | 0.2 | 5.0 | Within xy plane | 12.0% | 30% | 4% | — | 100% | 60% |
| Example 103 | 2.1 | 0.4 | 5.3 | Within xy plane | 12.0% | 30% | 4% | — | 100% | 67% |
| Example 104 | 5.0 | 1.0 | 5.0 | Within xy plane | 12.0% | 30% | 4% | — | 99% | 76% |
| Example 105 | 11.0 | 2.2 | 5.0 | Within xy plane | 12.0% | 30% | 4% | — | 101% | 75% |
| Example 106 | 25.1 | 5.6 | 4.5 | Within xy plane | 12.0% | 30% | 4% | — | 101% | 73% |
| Example 107 | 8.1 | 1.0 | 8.1 | Within xy plane | 12.0% | 30% | 4% | — | 101% | 83% |
| Example 108 | 15.5 | 1.9 | 8.2 | Within xy plane | 12.0% | 30% | 4% | — | 101% | 73% |
| Example 109 | 24.0 | 3.2 | 7.5 | Within xy plane | 12.0% | 30% | 4% | — | 98% | 67% |

TABLE 4-continued

| | Major axis length of carbon material (μm) | Minor axis length of carbon material (μm) | Aspect ratio | Orientation direction | Ratio of carbon materials in active material layer | Ratio of voids which is in contact with carbon materials | Porosity | Porosity of intermediate layer | Initial capacity | Cycle characteristics |
|---|---|---|---|---|---|---|---|---|---|---|
| Example 110 | 38.9 | 4.7 | 8.3 | Within xy plane | 12.0% | 30% | 4% | — | 101% | 60% |
| Example 111 | 45.0 | 5.5 | 8.2 | Within xy plane | 12.0% | 30% | 4% | — | 100% | 51% |
| Example 112 | 0.2 | 0.1 | 2.0 | Within xy plane | 12.0% | 30% | 4% | — | 101% | 57% |
| Example 113 | 1.8 | 0.9 | 2.0 | Within xy plane | 12.0% | 30% | 4% | — | 100% | 59% |
| Example 114 | 4.8 | 0.9 | 5.3 | Within xy plane | 12.0% | 30% | 4% | — | 98% | 76% |
| Example 115 | 8.1 | 0.9 | 9.0 | Within xy plane | 12.0% | 30% | 4% | — | 99% | 78% |
| Example 116 | 14.0 | 0.9 | 15.6 | Within xy plane | 12.0% | 30% | 4% | — | 102% | 73% |
| Example 117 | 22.1 | 0.9 | 24.6 | Within xy plane | 12.0% | 30% | 4% | — | 100% | 63% |
| Example 118 | 26.0 | 0.9 | 28.9 | Within xy plane | 12.0% | 30% | 4% | — | 100% | 54% |

25

TABLE 5

| | Major axis length of carbon material (μm) | Minor axis length of carbon material (μm) | Aspect ratio | Orientation direction | Ratio of carbon materials in active material layer | Ratio of voids which is in contact with carbon materials | Porosity | Porosity of intermediate layer | Initial capacity | Cycle characteristics |
|---|---|---|---|---|---|---|---|---|---|---|
| Example 119 | 5.1 | 0.9 | 5.6 | Within xy plane | 2.7% | 30% | 2% | — | 124% | 64% |
| Example 120 | 5.1 | 0.9 | 5.6 | Within xy plane | 4.3% | 30% | 3% | — | 110% | 70% |
| Example 121 | 5.1 | 0.9 | 5.6 | Within xy plane | 12.0% | 30% | 6% | — | 98% | 75% |
| Example 122 | 5.1 | 0.9 | 5.6 | Within xy plane | 20% | 30% | 9% | — | 85% | 83% |
| Example 123 | 5.1 | 0.9 | 5.6 | Within xy plane | 27% | 30% | 12% | — | 68% | 77% |
| Example 124 | 5.1 | 0.9 | 5.6 | Within xy plane | 35% | 30% | 15% | — | 55% | 86% |
| Example 125 | 5.1 | 0.9 | 5.6 | Within xy plane | 12.0% | 8% | 4% | — | 102% | 59% |
| Example 126 | 5.1 | 0.9 | 5.6 | Within xy plane | 12.0% | 11% | 4% | — | 98% | 66% |
| Example 127 | 5.1 | 0.9 | 5.6 | Within xy plane | 12.0% | 30% | 4% | — | 100% | 77% |
| Example 128 | 5.1 | 0.9 | 5.6 | Within xy plane | 12.0% | 50% | 4% | — | 101% | 81% |
| Example 129 | 5.1 | 0.9 | 5.6 | Within xy plane | 12.0% | 70% | 4% | — | 100% | 77% |
| Example 130 | 5.1 | 0.9 | 5.6 | Within xy plane | 12.0% | 80% | 4% | — | 103% | 69% |
| Example 131 | 10.0 | 0.9 | 11.1 | Random | 12.0% | 30% | 4% | — | 100% | 59% |
| Example 132 | 10.0 | 0.9 | 11.1 | Within xy plane | 12.0% | 18% | 2% | — | 110% | 57% |
| Example 133 | 10.0 | 0.9 | 11.1 | Within xy plane | 12.0% | 25% | 3% | — | 104% | 68% |
| Example 134 | 10.0 | 0.9 | 11.1 | Within xy plane | 12.0% | 30% | 4% | — | 102% | 75% |
| Example 135 | 10.0 | 0.9 | 11.1 | Within xy plane | 12.0% | 30% | 8% | — | 96% | 77% |
| Example 136 | 10.0 | 0.9 | 11.1 | Within xy plane | 12.0% | 30% | 12% | — | 77% | 83% |
| Comparative Example 2 | 10.0 | 0.9 | 11.1 | Within xy plane | 12.0% | 2% | 4% | — | 102% | 37% |

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte layer
4 Laminate
5 First external terminal
6 Second external terminal
C Carbon material
V, V2 Void
The invention claimed is:

1. An all-solid-state battery comprising:
a positive electrode layer, a negative electrode layer, a solid electrolyte layer positioned between the positive electrode layer and the negative electrode layer, and side margin layers disposed on an outer periphery thereof along each of the positive electrode layer and the negative electrode layer, wherein
the positive electrode layer includes a positive electrode current collector and a positive electrode active material layer which is in contact with the positive electrode current collector,
the negative electrode layer includes a negative electrode current collector and a negative electrode active material layer which is in contact with the negative electrode current collector,
each of the positive electrode active material layer and the negative electrode active material layer has a plurality of voids and a plurality of carbon materials therein,
8% or more of the plurality of voids are in contact with any of the plurality of carbon materials
each of the side margin layers is a region which a plurality of voids are formed,
8% or more of the plurality of voids in the side margin layers are in contact with any of the plurality of carbon materials,
an area ratio of the plurality of carbon materials in the layer which includes the plurality of carbon materials and voids of the positive electrode active material layer and the negative electrode active material layer is 3% or more and 12% or less,
the plurality of voids in the positive active material layer are surrounded by the positive active material,
the plurality of voids in the negative active material layer are surrounded by the negative active material,
in the plurality of voids of each of the positive electrode active material layer and the negative electrode active material, only the carbon materials are included,
each of the side margin layers is a solid electrolyte;

each of the side margin layers entirely surrounds either the positive electrode layer or the negative electrode layer on at least three sides of the respective positive electrode layer or negative electrode layer, and
the plurality of voids in the side margin layers are surrounded by the solid electrolyte.

2. The all-solid-state battery according to claim 1, wherein
each of the plurality of carbon materials has shape anisotropy, and
the major axis direction of each of the carbon materials is oriented in an in-plane direction in which the positive electrode active material layer or the negative electrode active material layer spreads.

3. The all-solid-state battery according to claim 1, wherein
an average major axis length of the plurality of carbon materials is 0.2 μm or more and 40 μm or less, and
the average minor axis length of the plurality of carbon materials is 0.1 μm or more and 5 μm or less.

4. The all-solid-state battery according to claim 1, porosity calculated by dividing a difference between theoretical mass and measured mass by measured mass in the layer which includes the plurality of carbon materials and voids of the positive electrode active material layer and the negative electrode active material layer is 2% or more and 15% or less.

5. The all-solid-state battery according to claim 1, wherein a ratio of length of a cross-section outer perimeter of the carbon materials which is in contact with any of the voids in the cross-section crossing the positive electrode and the negative electrode is 10% or more and 70% or less.

6. The all-solid-state battery according to claim 1, wherein
an intermediate layer having ionic conductivity is provided between at least one of the positive and negative electrode layers and the solid electrolyte layer,
the intermediate layer has a plurality of voids, and
a ratio of the plurality of voids in the intermediate layer is 0.1% or more and 8% or less.

7. The all-solid-state battery according to claim 1, wherein
each of the side margin layers include a solid electrolyte.

8. The all-solid-state battery according to claim 1, wherein
the side margin layers are disposed along the positive electrode layer or the negative electrode layer.

9. The all-solid-state battery according to claim 1, wherein
the average major axis length of the plurality of carbon materials is 0.5 μm or more and 20 μm or less.

* * * * *